to be rendered.

United States Patent
Christ

(12) United States Patent
(10) Patent No.: US 7,121,065 B2
(45) Date of Patent: Oct. 17, 2006

(54) METHOD FOR CONTROLLING A BLISTER PACKAGING MACHINE

(75) Inventor: Richard Christ, Immelshausen (DE)

(73) Assignee: IWK Verpackungstechnik GmbH, Stutensee (DE)

( * ) Notice: Subject to any disclaimer, the term of this patent is extended or adjusted under 35 U.S.C. 154(b) by 0 days.

(21) Appl. No.: 10/539,044

(22) PCT Filed: Dec. 18, 2003

(86) PCT No.: PCT/EP03/14506

§ 371 (c)(1),
(2), (4) Date: Jun. 15, 2005

(87) PCT Pub. No.: WO2004/065219

PCT Pub. Date: Aug. 5, 2004

(65) Prior Publication Data

US 2006/0117718 A1    Jun. 8, 2006

(30) Foreign Application Priority Data

Jan. 23, 2003    (DE) .............................. 103 02 724

(51) Int. Cl.
   *B65B 57/04*    (2006.01)
   *B65B 47/00*    (2006.01)
   *B65B 51/06*    (2006.01)

(52) U.S. Cl. .............................. 53/453; 53/478; 53/75; 53/329.4

(58) Field of Classification Search .................. 53/453, 53/478, 75, 561, 329.4, 374.4, 77
See application file for complete search history.

(56) References Cited

U.S. PATENT DOCUMENTS

| 3,982,380 | A |   | 9/1976 | Seragnoli |
| 4,288,967 | A | * | 9/1981 | Seko et al. .................. 53/550 |
| 4,525,977 | A | * | 7/1985 | Matt .............................. 53/55 |
| 4,549,386 | A | * | 10/1985 | Wilson .......................... 53/51 |
| 5,262,618 | A |   | 11/1993 | Thelen |
| 5,357,731 | A | * | 10/1994 | Conway et al. ............ 53/374.4 |
| 5,466,326 | A |   | 11/1995 | Cherney |
| 5,806,277 | A |   | 9/1998 | Scheifele |
| 6,109,000 | A | * | 8/2000 | Conti ............................. 53/51 |
| 6,732,496 | B1 | * | 5/2004 | Wessman et al. ............. 53/479 |

FOREIGN PATENT DOCUMENTS

| DE | 1 806 492 | 5/1970 |
| DE | 41 22 903 | 1/1993 |
| EP | 0 190 498 | 8/1986 |
| EP | 0 519 529 | 12/1992 |
| EP | 1 086 898 | 3/2001 |
| WO | WO 96/26066 | 8/1996 |

* cited by examiner

*Primary Examiner*—Stephen F. Gerrity
(74) *Attorney, Agent, or Firm*—Paul Vincent

(57) ABSTRACT

A method for controlling a blister packaging machine during which a bottom film provided with a recess is, inside or in front of a sealing station, brought together with a top film and is guided through the sealing station at a constant speed of conveyance. A sealing roll, whose temperature can be controlled, is provided inside the sealing station and serves to seal the top film onto the bottom film. The speed of conveyance can be preselected in an at least indirect manner. When selecting a modified set value of the conveyance speed, the temperature of the sealing roll and the speed of conveyance are modified according to a predetermined characteristic curve until the predetermined set value of the speed of conveyance is reached.

2 Claims, 2 Drawing Sheets

METHOD FOR CONTROLLING A BLISTER PACKAGING MACHINE

Figure 1:
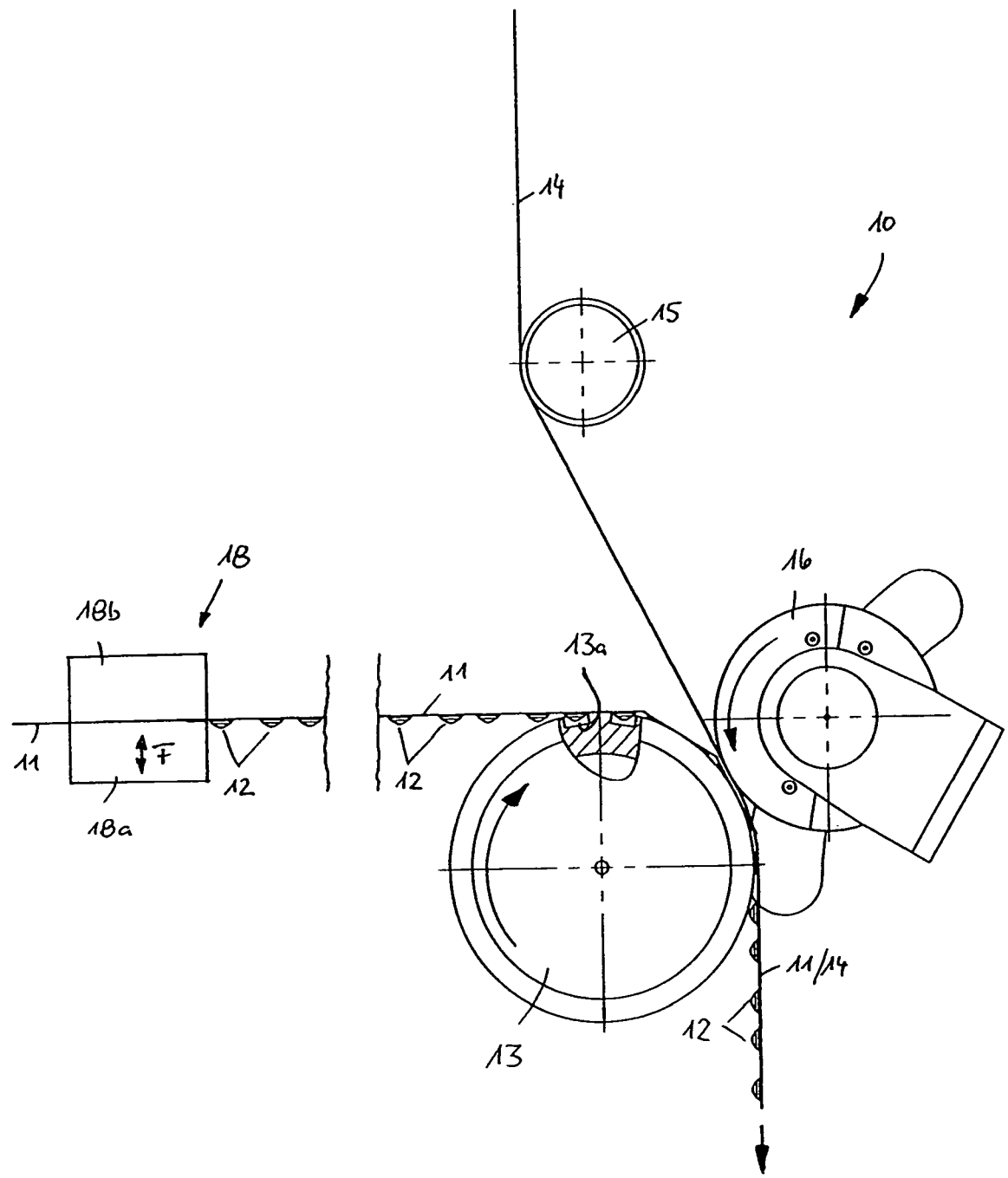

This application is the national stage of PCT/EP2003/014506 filed on Dec. 18, 2003 and also claims Paris Convention priority of DE 103 02 724.6 filed Jan. 23, 2003.

BACKGROUND OF THE INVENTION

The invention concerns a method for operating a blister packaging machine, wherein a bottom sheet provided with cup-shaped recesses is combined with a top sheet in or upstream of a sealing station, and is guided at a constant transport speed V through the sealing station, wherein the sealing station contains a sealing roller, which can be temperature-controlled, for sealing the top sheet onto the bottom sheet, and wherein the transport speed V can be preselected in an at least indirect manner.

The invention also concerns a corresponding blister packaging machine.

A blister packaging machine of conventional structure comprises a forming station, in which a plurality of cup-shaped depressions are formed into a bottom sheet, which consists of plastic material or aluminium, into which a product, e.g. a pharmaceutical tablet, is inserted in a downstream filling station. After product supply, the bottom sheet is fed to a sealing station. A cover sheet is introduced directly before or within the sealing station and disposed on the bottom sheet. The cover sheet is tightly sealed onto the bottom sheet within the sealing station using heat, thereby enclosing the product in the cup-shaped depression.

The forming station is operated in cycles and therefore discontinuously. The sealing station can also be operated in cycles or, alternatively, continuously, wherein conventional compensation means effect transfer between cyclical operation of the forming station and continuous operation of the sealing station.

The invention concerns a continuously operated sealing station which usually utilizes a sealing roller which can be controlled to a predetermined desired temperature using a heating device. The bottom sheet is transported, together with the cover sheet, at a constant transport speed V through the sealing station i.e. through the gap between the sealing roller and a counter roller, wherein heat is transferred from the sealing roller to the sheets, thereby connecting them.

Heat transfer between the sealing roller, which is kept at a constant temperature, and the sheets depends on the transport speed V. At high transport speeds, the contact time between the sealing roller and the sheets is relatively short, and only a small amount of heat can be introduced into the sheets. If insufficient heat is introduced into the sheets, the sealing may be incomplete and the bottom sheet and cover sheet might not be tightly sealed. At slow transport speeds, the contact time between the sealing roller and the sheets is relatively long and a large amount of heat is consequently introduced into the sheets which could cause damage to the relatively heat-sensitive cover sheet. Proper sealing between the bottom sheet and the cover sheet is also not ensured in this latter case.

To prevent the above-mentioned problems in a conventional blister packaging machine, before operation start, the packaging machine is set to a desired optimum cycle rate or to a sheet transport speed which is directly proportional thereto, and a corresponding sealing roller temperature.

If a lower cycle rate or transport speed is temporarily desired for production reasons, the packaging machine is stopped and the user adjusts the reduced cycle time. Moreover, the user tries to determine and adjust a suitable temperature setting for the sealing roller from his/her experience. This method is very cumbersome and requires specially trained personnel. Practice has shown that, through trial and error, a substantial amount of time is needed to find a suitable temperature for the sealing roller to match the reduced cycle time. In the meantime, the packaging machine is inoperative. This is highly uneconomical.

It is the underlying purpose of the invention to provide a method for controlling a blister packaging machine for changing the transport speed of the sheets or the cycle time and the temperature of the sealing roller in a rapid and coordinated manner. Moreover, a blister packaging machine shall be provided which facilitates performance of the method.

SUMMARY OF THE INVENTION

This object is achieved in the method having the features of the independent claim.

If the desired value $V_s$ of the transport speed is to be changed, the temperature T of the sealing roller and the transport speed V are changed in correspondence with a predetermined characteristic curve K until the predetermined desired value $V_s$ of the transport speed has been obtained.

A machine memory stores a characteristic curve for the relationship between the transport speed V and the temperature T of the sealing roller. In this manner, each sheet transport speed within an admissible working range of the transport speed is associated with an optimum sealing roller temperature T. If the user requires a different, e.g. reduced transport speed, the temperature of the sealing roller and the transport speed are reduced along or at least close to the predetermined characteristic curve using a control device until the desired transport speed and the associated temperature of the sealing roller are obtained. It is thereby ensured that even when the transport speed and the temperature of the sealing roller are changed, these two values are matched at any state to obtain qualitative good sealing of the cover sheet on the bottom sheet.

A further advantage of the inventive method is that the transport speed and the temperature of the sealing roller may also be changed during operation of the packaging machine, since the characteristic curve stored in the machine ensures good sealing quality even if the control device changes the transport speed and the temperature of the sealing roller.

As mentioned above, a forming station which is operated in cycles is disposed upstream of the sealing station, wherein suitable conventional compensation means effect transfer between cyclical operation of the forming station and continuous operation of the sealing station. The cycle rate of the forming station and the transport speed of the sheets in the sealing station are directly proportional and adjusted to ensure continuous operation of the packaging machine over a long time period. It has turned out in practice that the cycle rate N of the forming station is a value which is easier to handle by the user than the transport speed of the sheets in the sealing station. In a preferred embodiment of the invention, the user therefore does not directly select or enter a change in the transport speed but enters a new desired cycle rate of the forming station into the control device thereby preselecting it. This value is then used in a calculation unit to calculate the corresponding transport speed. Instead of this indirect presetting of the transport speed of the sheets in the sealing station via the cycle time of the forming station, the desired transport speed may also be directly preselected.

In a preferred embodiment of the invention, each value $V_i$ of the transport speed is associated with an admissible range of the sealing roller temperature T, wherein the admissible temperature region is defined by the corresponding value of the characteristic line ± a tolerance value ΔT. This is based on the findings that good sealing quality of the cover sheet is obtained not only for a certain temperature value but that the temperature value may slightly differ, e.g. ±5° C. from the optimum temperature value in accordance with the characteristic curve without significantly impairing the sealing quality.

If the user selects a new desired value for the transport speed of the sheets, in one possible embodiment of the invention, the control device may initially slightly change the actual temperature $T_i$ of the sealing roller within the associated admissible temperature range, thereby keeping the momentary transport speed and subsequently adjust the transport speed in dependence on the actual momentary temperature of the sealing roller. The transport speed of the sheets and the temperature of the sealing roller are therefore changed in increments in a plurality of sequential steps or stages until the desired value of the transport speed and associated temperature value of the sealing roller are obtained, wherein the transport speed is adjusted to the temperature of the sealing roller within each step. Alternatively, the control device may initially slightly change the transport speed of the sheets thereby keeping the temperature of the sealing roller, and subsequently adjust the temperature of the sealing roller in dependence on the momentary transport speed of the sheets. In this case as well, the transport speeds of the sheets and the temperature of the sealing roller are incrementally changed in a plurality of sequential steps until the desired point on the characteristic curve has been reached, with the temperature of the sealing roller being adjusted to the transport speed of the sheets within each step.

The sealing roller has a heating device with a corresponding control or regulation, which increases and keeps the temperature of the sealing roller to/at a desired value. To reduce the temperature of the sealing roller, the power of the heating device may simply be reduced or switched off in the simplest embodiment, such that the temperature of the sealing roller is reduced through natural cooling. Alternatively, the sealing roller may have an associated cooling device for reducing the temperature of the sealing roller to a desired value and for keeping it at this value using the control or regulation device.

The inventive blister machine has a control device which permits at least indirect preselection of the transport speed V. The packaging machine is characterized in that, upon selection of a different desired value $V_s$ of the transport speed V, the temperature T of the sealing roller and the transport speed V can be changed by the control device in correspondence with a predetermined characteristic curve K until the predetermined desired value $V_s$ of the transport speed has been obtained. Towards this end, the actual values of the temperature of the sealing roller and of the transport speed of the sheets are determined either directly or at least indirectly within the sealing station. The temperature of the sealing roller can be gradually changed using the control device, wherein the transport speed is adjusted in dependence on the actual temperature of the sealing roller. Alternatively, the transport speed of the sheets can also be gradually changed using the control device and the temperature of the sealing roller can then be adjusted. Additional features of the inventive blister packaging machine can be extracted from the above description of the method.

Further details and features of the invention can be extracted from the following description of an embodiment with reference to the drawing.

BRIEF DESCRITION OF THE DRAWING

Figure 2:
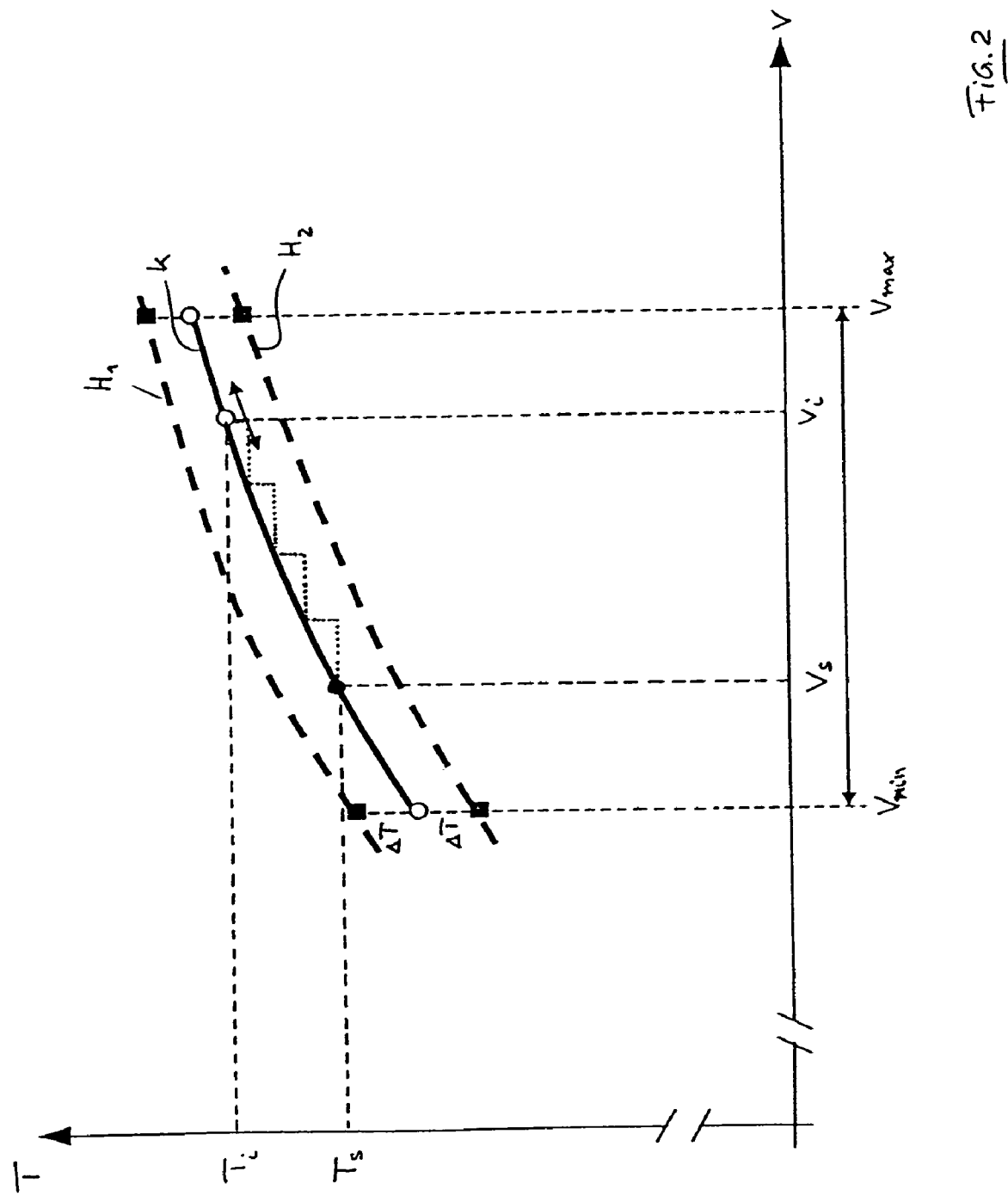

FIG. 1 shows a section through a sealing station of a blister packaging machine; and
FIG. 2 shows a characteristic curve for the relationship between the transport speed V and the temperature T.

DESCRIPTION OF THE THEPREFERRED EMBODIMENT

FIG. 1 shows the structure of a sealing station 10 of a blister packaging machine. The sealing station 10 comprises a rotationally driven index roller 13 having a plurality of recesses 13a on its outer surface. The index roller 13 has an associated rotating sealing roller 16 which can be temperature-controlled using a heating device (not shown) and be kept at a desired temperature.

The sealing station 10 has an upstream forming station 18 which comprises an upper forming plate 18b and a lower forming plate 18a which can be separated therefrom, as is indicated by the double arrow F. A bottom sheet 11 is supplied to the forming station 18 and is provided with a plurality of cup-shaped depressions 12 at that location to form receptacles, which are filled with a product in a filling station disposed between the forming station 18 and the sealing station 10 (not shown). The bottom sheet 11, filled with the product, travels on the index roller 13 such that the cup-shaped depressions 12 are disposed in the recesses 13a of the index roller 13.

A cover sheet 14 which consists of plastic material or aluminium is supplied from a supply (not shown) via a deflecting roller 15 of the sealing station 10 and disposed onto the bottom sheet 11 directly in front of the gap between the index roller 13 and the sealing roller 16. Thermal energy is introduced into the sheets using the sealing roller 16, thereby sealing the cover sheet 14 onto the bottom sheet 11 and enclosing the products in the cup-shaped depressions 12 of the bottom sheet 11.

While the forming station 18 is operated in cycles at a cycle rate N, the bottom sheet 11 and the cover sheet 14 pass through the sealing station 10 at a constant transport speed V. A conventional compensating means (not shown) provides transfer from cyclical operation of the forming station 18 to continuous operation of the sealing station 10.

The heat transfer between the sealing roller 16 and the bottom sheet 11 or cover sheet 14 depends on the transport speed V of the sheets within the sealing station 10. The contact time between the sealing roller 16 and the sheets 11 or 14 and therefore also the heat amount introduced into the sheets change in dependence on the transport speed V. In accordance with the invention, the transport speed V of the sheets and the temperature T of the sealing roller are always kept within a predetermined matched relationship, wherein even during changes in the transport speed and the temperature T, it is ensured at each stage that the momentary transport speed of the sheets is matched to the momentary temperature of the sealing roller to obtain good sealing results in combination therewith.

A characteristic curve K is stored in a data storage of the packaging machine (schematically shown in FIG. 2) which defines a unique relationship between the transport speed V of the sheets within the sealing station 10 and the temperature T of the sealing roller 16 within an admissible, predetermined range for the transport speed V between $V_{min}$ and $V_{max}$. An envelope $H_1$ and $H_2$, respectively, extends on each side of the characteristic curve K at a separation $\Delta T$ from that characteristic curve K and parallel thereto. While the characteristic curve K defines the optimum value of the temperature T of the sealing roller for any value of the transport speed V, the two envelopes $H_1$ and $H_2$ define an admissible region for the temperature T of the sealing roller for any value of the transport speed V, wherein the admissible region obtained is $K(V) \pm \Delta T$.

For reasons of clarity, it is assumed that the packaging machine is operated at a momentary transport speed $V_i$ and an associated temperature $T_1$ of the sealing roller. The user now wants to reduce the transport speed to a desired value $V_s$. As is shown in FIG. 2, the current temperature value $T_i$ is outside of the admissible temperature region which is associated with the desired value $V_s$ of the transport speed.

To reduce the transport speed from the current value $V_i$ to the desired value $V_s$ and reduce the temperature from the current value $T_i$ to the desired value $T_s$, the temperature is initially slightly reduced and the transport speed is then correspondingly adjusted or reduced until a value on the characteristic curve K is once more obtained (shown in the dotted line in FIG. 2). This gradual, incremental process is repeated until the transport speed has reached its desired value $V_s$ ad the temperature has reached its desired value $T_s$. As is shown in FIG. 2, the respective actual value of the transport speed and the actual value of the temperature is within the admissible range between the envelopes $H_1$ and $H_2$ at all times during adjustment of the packaging machine.

In a modification of the shown method, the transport speed of the sheets may also be initially slightly reduced and the temperature may then be adjusted until a value on the characteristic curve K is once more reached. In this case as well, the gradual, incremental process is repeated until the temperature and also the transport speed have reached their desired values $T_s$ and $V_s$, respectively.

I claim:

1. A method for controlling a blister packaging machine, the method comprising the steps of:
    a) providing a bottom sheet with cup-shaped receptacles;
    b) disposing a cover sheet proximate said bottom sheet;
    c) guiding said bottom sheet and said cover sheet, at a common transport speed, to a sealing station, the sealing station having a sealing roller for sealing the cover sheet onto the bottom sheet, the sealing roller being temperature controlled by a heating device;
    d) selecting a desired, lower transport speed for the bottom and cover sheets;
    e) reducing or switching-off a heating power of the heating device to effect a natural cooling and temperature reduction of the sealing roller;
    f) adjusting the transport speed in dependence on an actual temperature of the sealing roller, each value of the transport speed having an associated acceptable range of temperatures for the sealing roller, wherein the temperature of the sealing roller is kept within this acceptable temperature range; and
    g) sealing the cover sheet onto the bottom sheet during step f).

2. The method of claim 1, wherein a forming station, which is operated in cycles, is connected upstream of the sealing station and the transport speed V is directly proportional to a cycle rate N of the forming station, wherein the cycle rate N is pre-selectable.

* * * * *